United States Patent [19]

Hendrickson

[11] Patent Number: 4,475,444
[45] Date of Patent: Oct. 9, 1984

[54] BRAKE APPARATUS
[75] Inventor: Richard T. Hendrickson, South Bend, Ind.
[73] Assignee: The Bendix Corporation, Southfield, Mich.
[21] Appl. No.: 487,542
[22] Filed: Apr. 21, 1983
[51] Int. Cl.³ .......................... F15B 9/10; B60T 13/00
[52] U.S. Cl. .................................. 91/519; 91/369 A; 91/376 R; 92/97; 92/169
[58] Field of Search .................... 60/547.1, 554, 581; 92/169, 97, 99; 91/519, 49, 369 A, 376 R

[56] References Cited
U.S. PATENT DOCUMENTS

| 3,517,588 | 6/1970 | Kytta | 91/376 |
| 4,270,353 | 6/1981 | Thomas et al. | 60/547.1 |
| 4,393,750 | 7/1983 | Wagner | 92/169 |
| 4,394,832 | 7/1983 | Weiler et al. | 92/169 |
| 4,400,942 | 8/1983 | Reinartz et al. | 92/169 |
| 4,409,790 | 10/1983 | Seip | 60/547.1 |

FOREIGN PATENT DOCUMENTS
2040376 8/1980 United Kingdom .

Primary Examiner—Robert E. Garrett
Assistant Examiner—Scott L. Moritz
Attorney, Agent, or Firm—Leo H. McCormick, Jr.; Ken C. Decker

[57] ABSTRACT

A brake apparatus 10 having a master cylinder 16 with a flange 24 connected to a first shell 56 of a booster 18 and a stationary firewall 71 of a vehicle. A first wall 70 located between the flange 24 and first shell is connected to a piston 38 in the master cylinder 14. A second wall 144 located between the first shell 56, flange 24 and a second shell 121 is linked to the first wall 70 by a plurality of bolts 180 that pass through the flange 24. A valve 102 in response to an input controls the development of a pressure differential across the first and second walls 70 and 144. This pressure differential creates a force such that the first wall 70 pushes piston 38 while the second wall 144 pulls the first wall 70 to pressurize fluid in the master cylinder 16. Since the flange 24 fixes the master cylinder 16 to a stationary firewall 71, measurable axial deflection is eliminated and the entire input is used to operate valve 102 and effect a brake application.

12 Claims, 1 Drawing Figure

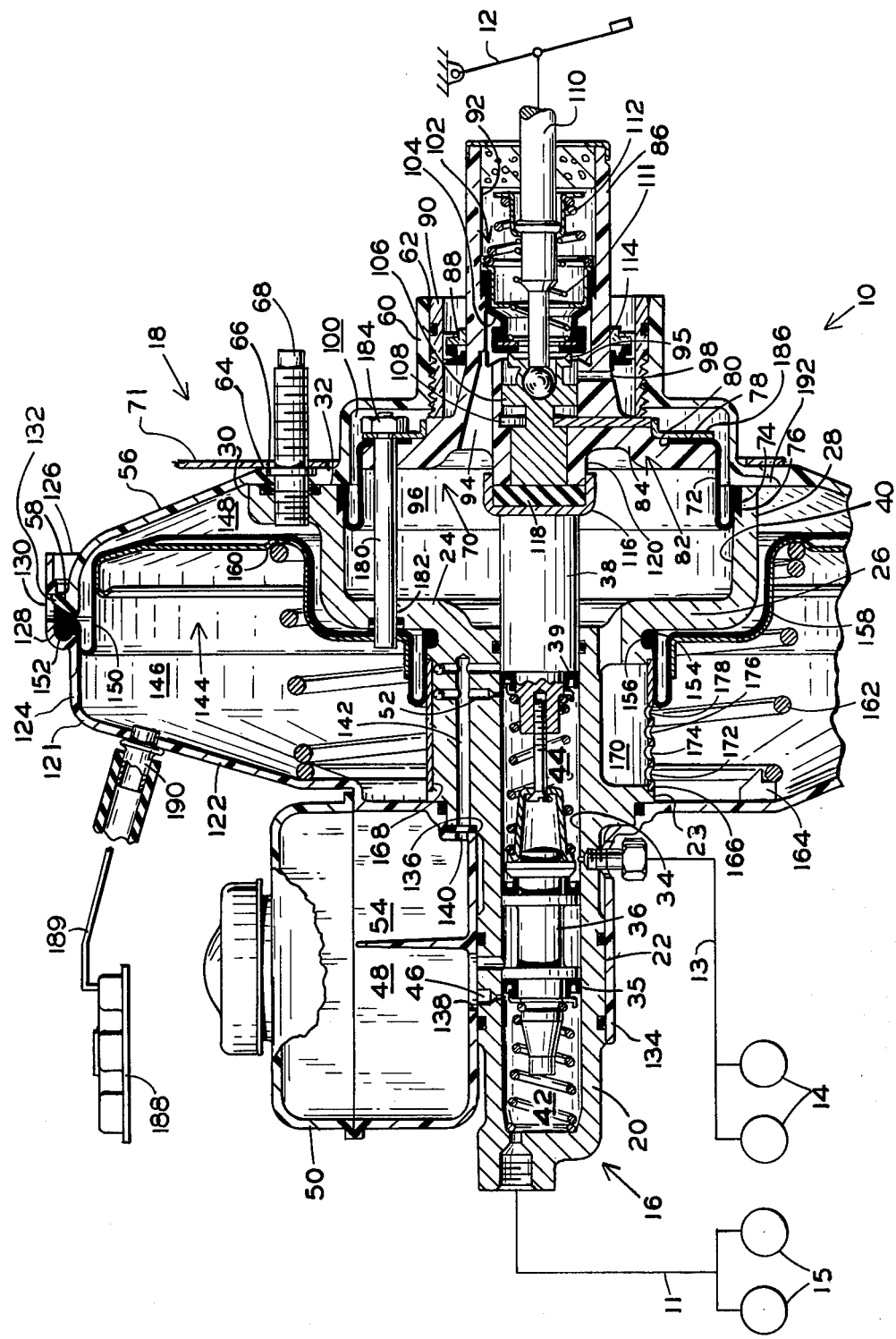

BRAKE APPARATUS

BACKGROUND OF THE INVENTION

This invention relates to a brake apparatus having a first wall that pushes a pressure responsive device while a second wall simultaneously pulls the first wall in response to the development of a pressure differential across the first and second walls.

Tandem servomotors of which that disclosed in U.S. Pat. No. 3,517,588 is considered typical, have first and second walls that are integrally tied to an output member that passes through a stationary wall that divides a housing into substantially equal first and second operational units. This type tandem servomotor is adequate for most operations. However, under some conditions, axial deflection can occur since all reaction forces must be carried through the housing to a stationary mounting structure. Such axial deflection can result in increased brake pedal travel in order to achieve a desired braking force. In order to reduce axial deflection, such a servomotor housing must be constructed of material that can resist bending. As a result, the thickness of such material from which the housing is constructed increases the weight of the servomotor as compared to the thickness required for only the operation of the servomotor.

In an effort to reduce the weight of a servomotor it has been proposed in U.S. Pat. No. 4,270,353 that the housing could be constructed of a lightweight material if the reaction forces were carried from a master cylinder to a stationary firewall by tie rods. In such structure, the movable wall must be sealed with respect to the tie rods which can result in frictional resistance under some operating conditions.

In an effort to avoid additional seals on the movable wall it has been proposed in U.K. Pat. No. 2,040,376 that the reaction forces be carried through a tube passing through the center of the servomotor housing. The tube is connected to the master cylinder and the stationary firewall of the vehicle. The movable wall is sealed to the tube and as a result that effective area is removed from the development of an output force.

SUMMARY OF THE INVENTION

The brake apparatus disclosed in this application is characterized by a pressure responsive device having a cylindrical housing with a flange on one end thereof that engages a surface on a first shell. Fastener means attached to the flange fix the pressure responsive device to a stationary bulkhead of a vehicle. A first wall is located between the flange and the first shell to define a first control chamber and a first operationsl chamber. The cylindrical housing of the master cylinder extends through an opening in an end wall of a second shell and the second shell thereafter is joined to the first shell. A second wall located between the second shell and the first shell defines a second control chamber and a second operational chamber. Linkage extends through the flange on the cylindrical housing to join the first wall to the second wall. An output member connected to the first wall extends into the cylindrical housing of the pressure responsive device. In response to an input, fluid communicated to the first and second operational chambers develops a pressure differential with the fluid in the first and second control chambers. This pressure differential acts on the first wall to produce an output force that pushes the output member. At the same time, the pressure differential acts on the second wall to produce a force that is transmitted through the linkage member to pull the first wall.

An advantage of this brake apparatus is that the reaction forces developed in response to the output force is transmitted through the flange into the stationary bulkhead of a vehicle.

Another advantage of this brake booster results in the output force produced by the movement of the tandem walls in which one wall pushes on an output member while a second wall pulls the first wall.

A still further advantage of this invention occurs through the transfer of reaction forces produced in a pressure responsive device directly into a stationary member thereby allowing a concentric booster to deflect without effecting an input signal.

It is an object of this invention to provide a brake apparatus having first and second movable walls with a linkage apparatus which is retained in an end wall through which relative movement is transmitted between the first and second wall. The linkage maintaining the first and second walls in alignment within separate housings, one of which is formed by a flange on pressure responsive member and a first shell while the other is formed by the first shell and a second shell.

These and other advantages and objects of this invention should be apparent from reading this specification while viewing the drawings.

BRIEF DESCRIPTION OF THE DRAWINGS

The drawing is a schematic illustration of a brake system for a vehicle with a sectional view of a brake apparatus made according to the principles of this invention.

DETAILED DESCRIPTION OF THE INVENTION

The brake apparatus 10 shown in the drawing receives an input from an operator through pedal 12. In response to the input, brake apparatus 10 supplies the front 14 and rear 15 wheel brakes with operational fluid to effect a brake application.

The brake apparatus 10 includes a master cylinder 16 and a tandem power assist booster 18.

The master cylinder 16 has a housing 20 which has first and second diameter sections 22 and 23 extending from a flange 24. Flange 24 has an end wall section 26 and a cylindrical section 28. The cylindrical section 28 has a plurality of radial tabs 30, only one is shown, adjacent to the end 32 thereof. The first and second diameter sections 22 and 23 have a first bore 34 located therein while cylindrical section 28 has a second bore 40. First and second pistons 36 and 38 located in bore 34 define chambers 42 and 44 which are connected to wheel brakes 15 and 14, respectively. A port 46 connects chamber 42 with compartment 48 in reservoir 50 and port 52 connects chamber 44 with compartment 54 via passage 142. In the rest position shown, fluid is freely communicated to chambers 42 and 44 to assure that the brake system is completely filled with fluid at all times.

The tandem power assist booster 18 has a first shell 56 with a peripheral lip 58 and an inner annular hub member 60 which surrounds opening 62. A radial flat surface 64 on first shell 56 has a plurality of openings 66 therein. A corresponding number of fasteners, bolts 68, attached to ears or tabs 30 on flange 24 extend through openings 66 to secure the master cylinder 16 and power assist booster 18 to stationary bulkhead 71 in the vehicle.

The end wall section 26 and that portion of the first shell 56 between the flat section 64 and hub member 60 form a first cavity.

A first wall 70 has a diaphragm 72 with a bead 74 that is located in a groove 76 adjacent end 32 of flange 24. Fastener 68 urges bead 74 into contact with flat surface 64 on the first shell 56 to establish an annular seal for the end 32 of flange 24. A second bead 78 on diaphragm 72 snaps into a groove 80 on a hub member 82.

Hub member 82 has a cylindrical body 84 with a projection 86 that extends through a bearing seal 88 associated with stop 90 in opening 60. Cylindrical body 84 has a central bore 92 connected to the atmosphere. A first passage 94 connects bore 92 to a first control chamber 96 while a second passage 98 connects bore 92 to a first operational chamber 100.

A valve arrangement 102 located in bore 92 has a poppet 104 with a free end and a fixed end. A plunger 106 retained in bore 92 by key 108 is connected to a push rod 110 attached to pedal 12. A return spring 112 acts on push rod 110 to bring face 114 into contact with the free end of poppet 104 to allow communication between chambers 96 and 100 by way of passages 94 and 98 and bore 92.

An annular cap 116 which surrounds a resilient reaction disc 118 is connected to piston 38 of the master cylinder. The cap 116 which is free to move on annular surface 120 retains the reaction disc 118 in a confined area.

A second shell 121 has an end wall 122 connected to a cylindrical section 124. The cylindrical section 124 has a peripheral section 126 with a groove 128 located therein. A plurality of windows 130 are adjacent to lip tabs 132. An integral projection 134 extends from an opening 136 in the end wall 122. The projection 134 surrounds the first diameter section 22 of the master cylinder housing 20. Opening 138 in projection 134 is aligned with port 46 while opening 140 is aligned with passage 142 in the housing 20 that connects port 52 with chamber 54. The first diameter section 22 of housing 20 is such that a fluid seal is developed with port 46 and passage 142 when tabs 132 on the peripheral lip 58 are located in windows 130 to define a second cavity. The second cavity is divided into a control chamber 146 and an operational chamber 148 by a wall 144.

The wall 44 has a diaphragm 150 with a first bead 152 fixed in groove 128 and a second bead 154 located in groove 156 in housing 20 of the master cylinder. A backing plate 158 has a rib 160 for holding one end coil of return spring 162 while lip 164 on end wall 122 holds the other end coil.

A sleeve 166 snaps into a groove 168 in the second diameter 24 to provide a smooth surface for diaphragm 150 to roll on without being damaged by edges on passage 170 that connect the first control chamber 96 with the second control chamber 146. Opening 172, 174, 176, 178 in sleeve 166 assures that communication to passage 170 continues when wall 144 moves toward end wall 122.

A plurality of bolts 180 (only one of which is illustrated) which have a first end fixed to backing plate 158 extend through opening 182 in end wall 26 of flange 24. A nut 184 attached to the second end of bolt 180 holds an annular plate 186 against bead 78 of diaphragm 72 to assure a fluid seal is created between chambers 96 and 100.

MODE OF OPERATION OF THE INVENTION

When a vehicle is equipped with a brake apparatus 10, vacuum produced at the intake manifold 188 is communicated through end wall 122 by way of check valve 190 to chamber 146. Since chambers 146 and 96 are in continual communication by way of passage 170, the fluid pressure level therein is substantially constant resulting in the development of control pressure. Chamber 148 is connected to chamber 100 by way of a series of passages 192 only one of which is shown, and as a result the fluid pressure therein is substantially identical. In the rest position shown in the drawing, any air present in the operational chambers 100 and 148 flows to the intake manifold 188 by way of passage 98, that portion of bore 92 in front of poppet 104, passage 94, chamber 96, passage 170, chamber 146 and conduit 189.

When an operator desires to effect a brake application, an input force is applied to pedal 12 which imparts linear movement to push rod 110. Initial movement of push rod 110 allows spring 111 to move the free end of poppet 104 against seat 95 to interrupt vacuum communication to bore 92 by way of passage 94. Further movement of plunger 106 by push rod 110 moves face 114 away from poppet 106 to allow air present in bore 92 to flow into the operational chambers 100 and 148. With air in chambers 100 and 148, a pressure differential is created across walls 70 and 144. The pressure differential across wall 70 produces a force that is transferred into hub 84 and pushes on reaction disc 118 to provide piston 38 with linear movement to interrupt communication between reservoir 50 and chamber 44, as seal 39 moves past port 52, and chamber 42 as seal 35 moves past port 46. After ports 46 and 52 have been closed, the fluid in chambers 42 and 44 is pressurized and communicated to the wheel brakes 14 and 15 by conduits 11 and 13.

The pressure differential developed across wall 144 acts on backing plate 158 to overcome spring 162 and move the backing plate 162 toward end wall 122. This force is transferred to hub member 84 by way of bolts 180 and annular plate 186 to pull the hub 82 forward.

As the fluid pressure in chambers 42 and 44 increases, the resistance to movement of pistons 36 and 38 produces a reaction force that is carried through reaction disc 118 into plunger 106 to resist movement thereof by the input from the operator.

At the same time the reaction to movement of pistons 36 and 38 is carried by flange 24 into the fixed or stationary firewall 71. Since firewall 71 is stationary, no axial deflection occurs and the entire input from pedal 12 is translated into the operation of the brake apparatus 10.

On termination of the input to pedal 12, return spring 112 acts on push rod 110 to move face 114 on plunger 106 into engagement with the free end of poppet 104 to terminate the communication of air from the atmosphere through bore 92 to operational chambers 100 and 148. Further movement of plunger 106 by return spring 112 moves the free end of poppet 104 away from seat 95 to allow vacuum in chambers 96 and 146 to evacuate the air in chambers 100 and 148 and eliminate the pressure differential across walls 70 and 144. As the pressure differential is reduced, return spring 162 moves the walls toward shell 56 and eventually into engagement with an adjustable annular stop 90. This adjustable stop 90 is necessary in order to coordinate the actuation of control valve 102 with the closure of ports 46 and 52 in the master cylinder.

The effective area of the movable walls 70 and 144 is greater than a brake booster having a single wall even through the external dimensions of the first and second shells 56 and 120 are substantially identical. In the brake apparatus 10 the diameter of the first wall 70 had a ratio of 4:1 with respect to the second wall resulting in an increased output from the brake booster 18 of 15% without any measurable axial deflection.

I claim:

1. In a brake apparatus having first and second walls located in a housing and moved by a pressure differential to develop an output force for operating a pressure responsive device, characterized by said pressure responsive device having a flange thereon that engages a surface on said housing to separate said first wall from said second wall, said flange having fastening means connected thereto that extend through said housing to secure said pressure responsive device to a stationary member, said first wall having a hub with a projection that extends through an opening in said housing, a first diaphragm having a first bead located between said flange and said housing and a second bead attached to said hub to separate a first control chamber from a first operational chamber, said hub having a bore therein for retaining a control valve, said control valve being responsive to an input to allow fluid to be communicated to said operational chamber to create said pressure differential, and linkage means extending through said flange to connect said first wall to said second wall for transmitting motion of one of said walls to the other of said walls in order to operate said pressure responsive device.

2. In the brake apparatus as recited in claim 1 wherein said first wall pushes said pressure responsive device while said second wall pulls said first wall.

3. In the brake apparatus, as recited in claim 1 wherein said linkage means includes:
    an annular plate for holding said first bead of the first diameter against said hub; and
    a plurality of connecting rods having a first end attached to said annular plate and a second end attached to said second wall, said motion of said second wall being transferred through an annular plate into said hub.

4. In the brake apparatus as recited in claim 3 wherein said housing is characterized by an adjustable bearing and seal member that surrounds said projection on said first wall and engages said hub to establish a stop to establish a rest position for said pressure responsive device.

5. In the brake apparatus as recited in claim 1 wherein said housing is characterized by a first shell containing said opening for retaining said projection on said hub, a sealing surface that engages said flange on the pressure responsive device and a peripheral surface and a second shell containing an end member having a central opening and a cylindrical section attached to the end member, said cylindrical section being connected to said peripheral surface on said first shell to define said housing.

6. In the brake apparatus as recited in claim 5 wherein said second wall includes a second diaphragm having a first bead located between connection of the peripheral surface of said first shell and cylindrical section of said second shell and a second bead secured to define a second control chamber and a second operational chamber within said housing, said first and second control chambers and said first and second operational chambers being connected to each other, said second wall further including a backing plate for said second diaphragm to which said second end of the connecting rod is attached to transfer movement of said second diaphragm to said first wall.

7. In the brake apparatus as recited in claim 6 wherein said pressure responsive device is characterized by a cylindrical member having a bore therein for receiving piston means connected to said hub of the first wall, said flange having a cylindrical lip that extends from a radial end wall into engagement with said first shell, said plurality of connecting rods passing through openings in said radial end wall, said end wall adjacent said opening providing a bearing surface for said connecting rods to substantially align said first and second walls in the axial center of said housing.

8. In the brake apparatus as recited in claim 7 wherein said radial end wall is further characterized by a passage for connecting said first and second control chambers to each other.

9. In the brake apparatus as recited in claim 8 wherein said first shell is characterized by a passage whereby said first operational chamber is connected to said second operational chamber.

10. A brake apparatus comprising:
    a pressure responsive housing having a first cylindrical member with a first diameter section separated from a second diameter section by a first end wall, said first diameter having a first bore therein and said second diameter section having a second bore therein, said second diameter section having a plurality of radial ears on the end thereof;
    piston means located in said first bore to pressurize fluid therein;
    a first shell having a peripheral section with an annular lip thereon, a radial section and central section, said central section having an opening therein;
    fastener means connected to said plurality of ears for connecting said second diameter section to said radial section to define a first cavity between said first end wall, second diameter section and central section;
    first wall means for dividing said first cavity into a first control chamber and a first operational chamber;
    a second shell having a second end wall and a second cylindrical section, said second end wall having an opening, said first diameter section of the pressure responsive housing extending through said opening in said second end wall, said second cylindrical section being connected to said peripheral section to define a second cavity between said second end wall, second cylindrical section, the area between the radial section and peripheral section of said first shell and the first and second diameter section of the first cylindrical member;
    second wall means for dividing said second cavity into a second control chamber and a second operational chamber;
    linkage means for connecting said first wall means with said second wall means;
    valve means responsive to an input for permitting a fluid to be communicated to said first and second operational chambers to create a pressure differential across said first and second walls, said pressure differential developing first and second output forces such that said first wall pushes on said piston means to pressurize fluid in said first bore while said second wall pulls said first wall; and a sleeve for surrounding a portion of said first diameter section of said first cylindrical member adjacent said first end wall, said sleeve having a series of openings therein through which said second chamber is connected to said first chamber, said sleeve forming a substantially smooth surface which permits said second wall to freely move in said second chamber.

11. In the brake apparatus, as recited in claim 10 wherein said linkage means includes a plurality of connecting rods that extend through said first end wall, said connecting rods transmitting motion between said first and second walls.

12. In the brake apparatus, as recited in claim 11 wherein said first diameter section of said first cylindrical member of the pressure responsive housing includes a plurality of passages for connecting a reservoir to said first bore and a conduit adjacent said openings in said sleeve for connecting said first control chamber with the second control chamber.

* * * * *